US012542074B1

(12) United States Patent
Manninen et al.

(10) Patent No.: US 12,542,074 B1
(45) Date of Patent: Feb. 3, 2026

(54) DISPLAY WITH A BASE AND AN INSERT

(71) Applicant: Manninen Innovations, LLC, Fond du Lac, WI (US)

(72) Inventors: Kenneth John Manninen, Fond du Lac, WI (US); Logan John Manninen, Fond du Lac, WI (US); Paul Julian Schreifels, Fond du Lac, WI (US)

(73) Assignee: Manninen Innovations, LLC, Fond du Lac, WI (US)

( * ) Notice: Subject to any disclaimer, the term of this patent is extended or adjusted under 35 U.S.C. 154(b) by 178 days.

(21) Appl. No.: 18/209,986

(22) Filed: Jun. 14, 2023

Related U.S. Application Data

(60) Provisional application No. 63/352,398, filed on Jun. 15, 2022.

(51) Int. Cl.
*G09F 7/00* (2006.01)
*G09F 1/12* (2006.01)
*G09F 19/00* (2006.01)

(52) U.S. Cl.
CPC .................................... *G09F 1/12* (2013.01)

(58) Field of Classification Search
CPC ......... G11B 33/0466; G09F 1/12; G09F 7/04; G09F 3/18; G09F 7/10
See application file for complete search history.

(56) References Cited

U.S. PATENT DOCUMENTS 1,119,925 A * 12/1914 Chatham ................ B42F 17/00 211/11
3,371,439 A * 3/1968 Smith .................... G03B 21/64 40/490
3,727,334 A * 4/1973 Sakamoto .............. G03B 21/64 40/536
4,829,691 A * 5/1989 Manjos ..................... G09F 3/18 40/733
4,860,468 A 8/1989 Cliborn
5,012,601 A * 5/1991 Garland .................... G09F 1/12 40/781

(Continued)

FOREIGN PATENT DOCUMENTS

FR 2928251 11/2009
GB 2466958 7/2010

OTHER PUBLICATIONS

Google Patents, Translation of FR2928251 (2009).

(Continued)

*Primary Examiner* — Shin H Kim
(74) *Attorney, Agent, or Firm* — Brannen Law Office, LLC

(57) ABSTRACT

The present invention is a display for an item such as a card, and can have a base with at least one cavity. Each cavity can have protrusions and finger releases, and can removably receive an insert. The insert has exterior walls with an external perimeter lip and an interior chamber. The perimeter lip of the insert is releasably held by the protrusions of the base cavity. The interior chamber of the insert has retainers. The retainers releasably hold a case that is inserted into the interior chamber. The interior chamber dimensions are selected to accommodate specific sized cases. Regardless of the interior chamber dimensions, all inserts preferably have the same external wall dimensions. A cover can optionally be provided as either an integrated component with the insert or as separate component.

16 Claims, 16 Drawing Sheets

(56) References Cited

U.S. PATENT DOCUMENTS

| | | | | | |
|---|---|---|---|---|---|
| 5,040,671 | A * | 8/1991 | Hager | A45C 11/18 206/39 |
| 5,046,616 | A | 9/1991 | Makowski et al. | |
| 5,096,752 | A | 3/1992 | Wagner | |
| 5,097,953 | A * | 3/1992 | Gingras | G09F 1/10 206/39 |
| 5,119,574 | A | 6/1992 | King | |
| 5,121,563 | A * | 6/1992 | Connor | G09F 3/18 40/781 |
| 5,186,566 | A | 2/1993 | Cameron | |
| 5,259,517 | A | 11/1993 | Pancoe | |
| 5,269,083 | A | 12/1993 | Vampatella et al. | |
| 5,344,015 | A * | 9/1994 | Carlin | G09F 1/12 206/425 |
| 5,363,964 | A * | 11/1994 | Hexter, Jr. | B65D 25/107 206/454 |
| 5,394,996 | A | 3/1995 | Carpenter | |
| 5,419,062 | A | 5/1995 | Polinski et al. | |
| 5,477,631 | A * | 12/1995 | Hewitt | G09F 7/10 206/39 |
| 5,488,656 | A * | 1/1996 | DeArkland | G09F 7/12 40/606.03 |
| 5,651,202 | A | 7/1997 | Hewitt | |
| 5,988,405 | A * | 11/1999 | Weisenburger | A47F 7/146 211/41.12 |
| 6,427,842 | B1 * | 8/2002 | Green | B65D 75/32 53/442 |
| 6,651,370 | B1 * | 11/2003 | Sud | B44C 5/02 40/738 |
| 6,694,650 | B2 * | 2/2004 | Brown | G09F 1/10 40/775 |
| 9,380,892 | B2 * | 7/2016 | Kallinger | A47G 1/12 |
| 9,486,094 | B2 * | 11/2016 | Killian | G09F 15/005 |
| 10,292,507 | B2 | 5/2019 | Baker | |
| 10,888,181 | B1 * | 1/2021 | Williams | A47G 1/0616 |
| 2003/0056412 | A1 | 3/2003 | Locker et al. | |
| 2004/0154204 | A1 * | 8/2004 | Fu | G09F 3/20 40/661.01 |
| 2006/0248769 | A1 | 11/2006 | Rose | |
| 2009/0096940 | A1 * | 4/2009 | Scheffer | A47G 25/06 348/836 |
| 2016/0000240 | A1 * | 1/2016 | Kallinger | A47G 1/065 40/768 |
| 2016/0073796 | A1 * | 3/2016 | Nesbitt | G09F 7/04 40/711 |
| 2024/0321144 | A1 * | 9/2024 | Huyke-Phillips | G09F 1/12 |

OTHER PUBLICATIONS

Generic, Ultimate PSA and BGS Graded Sports Card Hanging Wall Mount Protective Display Holder. 9.5 x 7.5 Inch Frame to Protect and Show Off Rare Standard Sized Certified Cards and Appraisal Plaque (1, Black), as viewed at: https://www.amazon.com/Ultimate-Protective-Standard-Certified-Appraisal/dp/B0987ZKQTZ/ref=sr_1_1?crid=SDPRHKC01FYL&dib=eyJ2ljoiMSJ9.ncNyiUjTabgzo_2pS524OWhcYn_kxKkgb3tJc50SNtuUPsinC5SbP-ksXOdvCInktpzswL1Bpwl6wXWzKuNYE6DomwHXy1m97MAr_qEWk7knikzUy1ZHj-.

* cited by examiner

DISPLAY WITH A BASE AND AN INSERT

This United States utility patent application claims priority on and the benefit of provisional application No. 63/352,398, filed Jun. 15, 2022, the entire contents of which are hereby incorporated herein by reference.

BACKGROUND OF THE INVENTION

1. Field of the Invention

The present invention relates to a display having a base and an insert, and in particular to a display useful for displaying one or more items.

2. Description of the Related Art

Many people collect items such as cards and other collectables of various types, which can include but is not limited to, pictures, comic books, coins, and stamps. Often times, people desire to protect their items with a case. The cases can be made of a rigid plastic. The present invention is described primarily in relation to cards. However, it can be used with any of these or other items without departing from the broad aspects of the present invention.

Several companies exist that grade cards for condition. Then, once the card is graded, it is often placed in a case. Unfortunately, there is not a uniform case size used by the grading companies. Instead, a case usually has external dimensions that are specific to the company that performed the grading. A person typically does not open the case again after the card has been graded.

Regardless of whether the cards are graded or not, some people like to display their cards. Some people use cases to protect their cards when being displayed. Several options exist for those people, including ledges and shelves, and even displays made specifically for cards.

Yet, none of the known existing products have the unique structures and advantages of the present invention.

Thus, there exists a need for a display with a base and an insert that solves these and other problems.

SUMMARY OF THE INVENTION

The present invention is a display for an item such as a card, and can have a base with at least one cavity. Each cavity can have protrusions and finger releases, and can removably receive an insert. The insert has exterior walls with an external perimeter lip and an interior chamber. The perimeter lip of the insert is releasably held by the protrusions of the base cavity. The interior chamber of the insert has retainers. The retainers releasably hold a case that is inserted into the interior chamber. The interior chamber dimensions are selected to accommodate specific sized cases. Regardless of the interior chamber dimensions, all inserts preferably have the same external wall dimensions. A cover can optionally be provided as either an integrated component with the insert or as separate component.

There are many aspects of the present invention, which each can have unique and independent advantages, as set out in particular in the appended claims.

According to one advantage of the present invention, the display can display many items including but not limited to cards. For example, the invention can be used with, pictures, comic books, stamps, coins, etc.

According to another advantage of the present invention, the display has a base with a cavity that removably receives an insert having an external dimension. The cavity has one or more cavity protrusions. The insert has a perimeter lip about the exterior wall, which is releasably held under the cavity protrusion(s). Finger releases are provided to allow a person to use their finger to force the insert out of the cavity by overcoming the locking engagement of the cavity protrusions and insert lips.

According to a further advantage of the present invention, the design is modular in that any number of rows and columns of cavities can be incorporated in the base during the manufacturing process. The invention is not limited to a configuration of rows and columns and instead covers all possible configurations of cavities.

According to a still further advantage of the present invention, the insert has an interior chamber with dimensions determined by a particular case that is intended to be received within the chamber. In the regard, the insert is an intermediary component to allow any sized case to be secured to the base so long as the proper sized insert is used. It is appreciated that, by using proper inserts, that card cases of different sizes can be simultaneously displayed in the same base.

According to a still further advantage yet of the present invention, each case can be centered within the base cavity on account of the centering provided by the insert.

According to a still further advantage yet of the present invention, the insert interior chamber has retainers that snuggly engage (via friction) the case sidewalls.

Corner clearances are provided to allow clearance of the case corners and interior chamber corners. The case is removable by flexing the insert and allowing the case to pop out of the chamber when the friction fitting engagement is overcome during the flexing of the insert.

It is appreciated that the engagement between the base cavity and insert, and between the insert interior chamber and the case, preferably requires a force greater than the force of gravity to be broken, yet, that the engagement can be overcome by a person even without tools. This advantageously prevents the inserts, cases and covers from falling out if the display is held with the cavities facing downward.

According to a still further advantage yet of the present invention, in an embodiment with multiple rows and columns of cavities (or any other configuration), some cavities (preferably the corner cavities) can have mounts that allow the base to be secured to the wall. The mounts are preferably hidden from view behind an inserted insert and case.

According to a still further advantage yet of the present invention, a cover can be provided. The cover, in one embodiment, can mate with the insert exterior walls and similarly be held under the cavity protrusions. This would provide a second lock to keep the case within the interior chamber of the insert. The insert exterior has corner snaps that mate with the cover exterior wall snaps.

According to a still further advantage yet of the present invention, a cover and insert can be removably matingly joined together via a snapping engagement, forming an interior area that can receive an item without the use of a case.

According to a still further advantage yet of the present invention, the lip of the insert is advantageously at the bottom plane of the cavity, wherein an insert of any depth can be held within the cavity.

According to a still further advantage yet of the present invention, the insert can be secured directly to a wall or other vertical surface, wherein the perimeter lip becomes a mounting lip to flushly engage the surface.

According to a still further advantage of the present invention, a single cover can cover the entire base for security or protection purposes.

According to an advantage of an alternative embodiment of the present invention, a cover can be integrated with the insert via a hinge.

Other advantages, benefits, and features of the present invention will become apparent to those skilled in the art upon reading the detailed description of the invention and studying the drawings.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
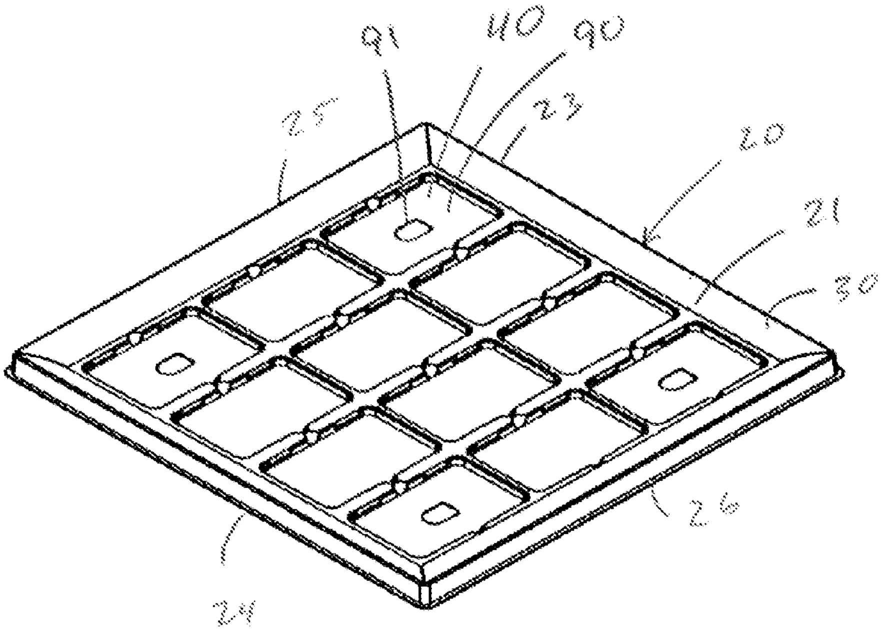
FIG. 1 is a front perspective view of an embodiment of a base of the present invention.
Figure 2:
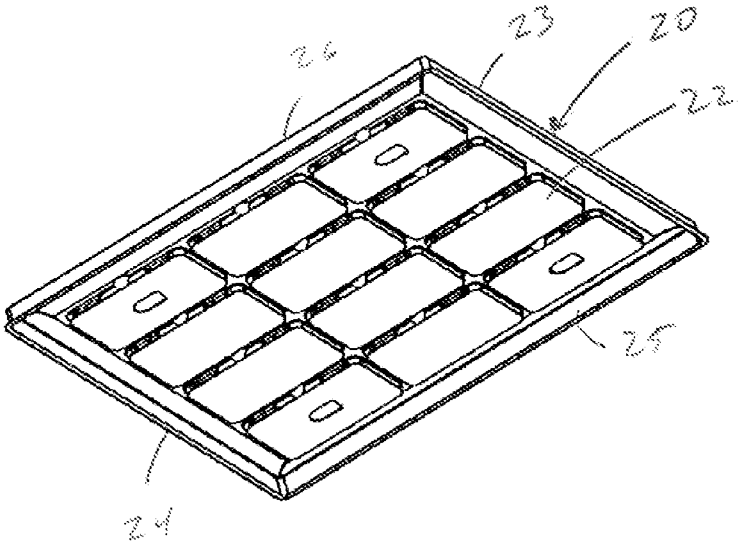
FIG. 2 is a rear perspective view of the base shown in FIG. 1.
Figure 3:
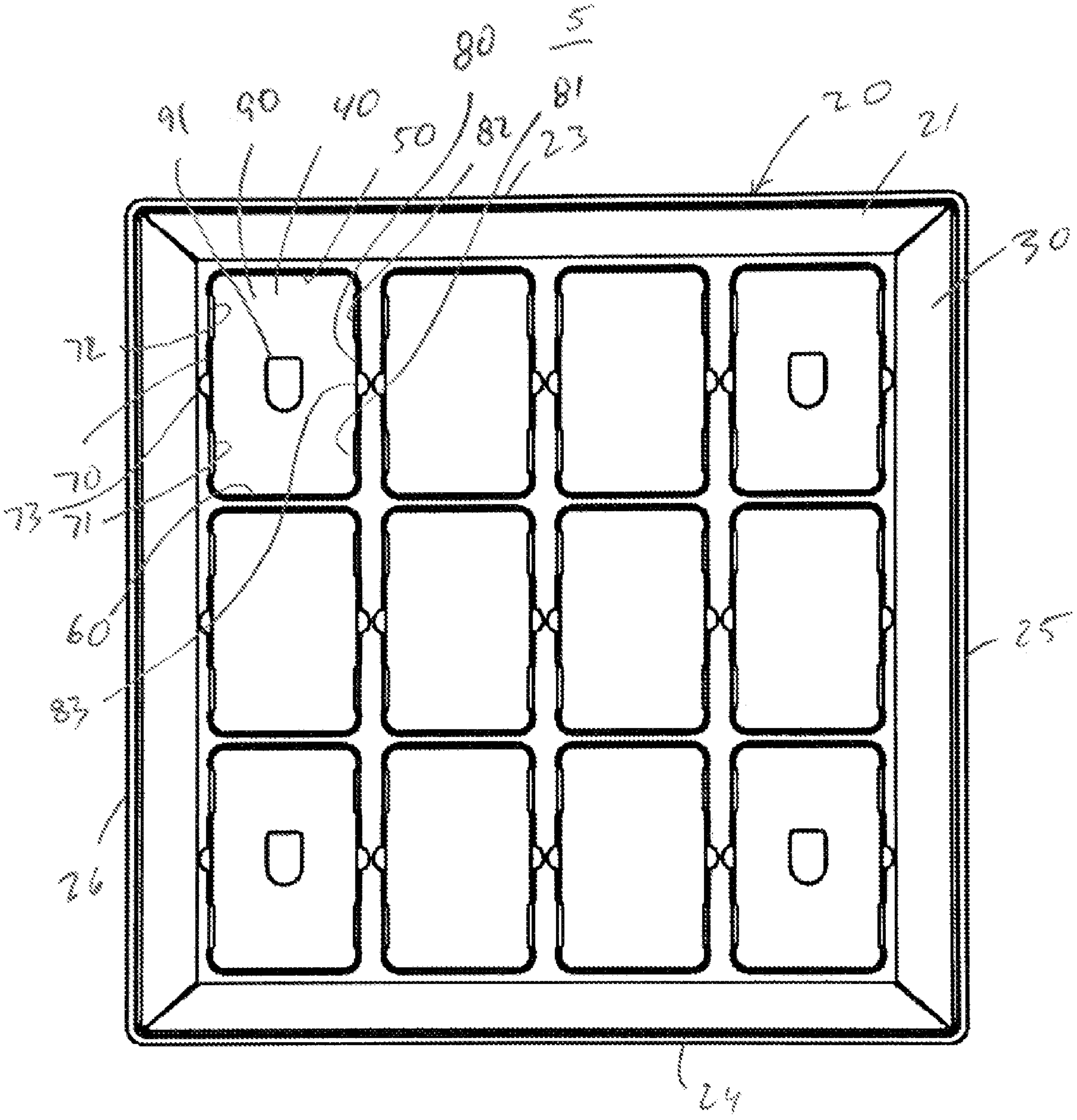
FIG. 3 is a front view of the base shown in FIG. 1.
Figure 4:
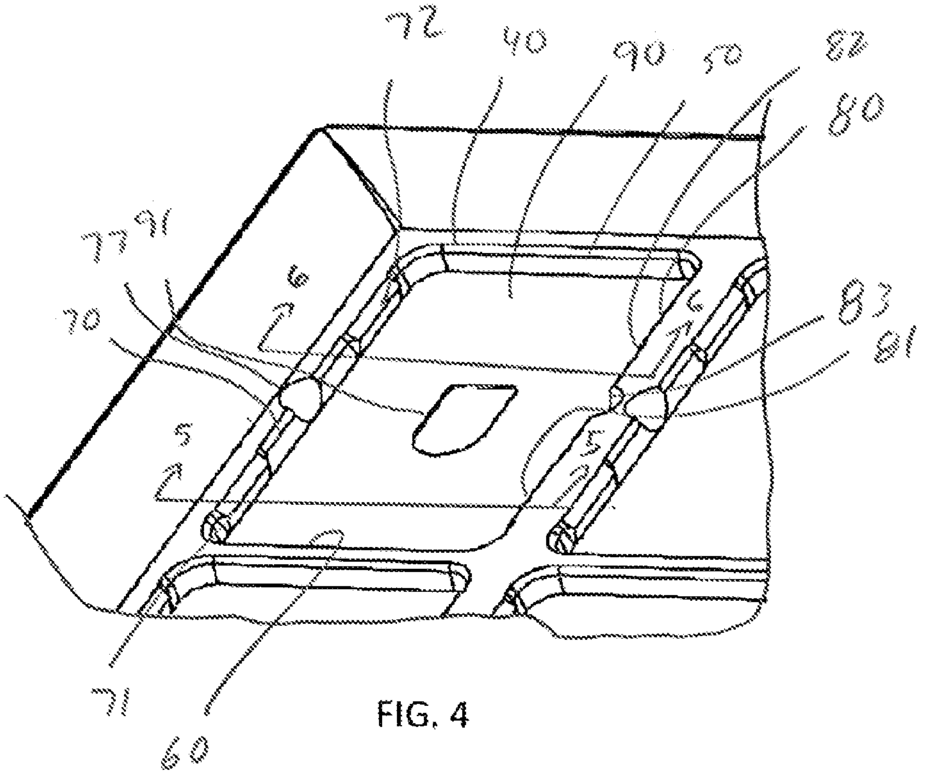
FIG. 4 is a close-up perspective view of a portion of FIG. 1.
Figure 5:
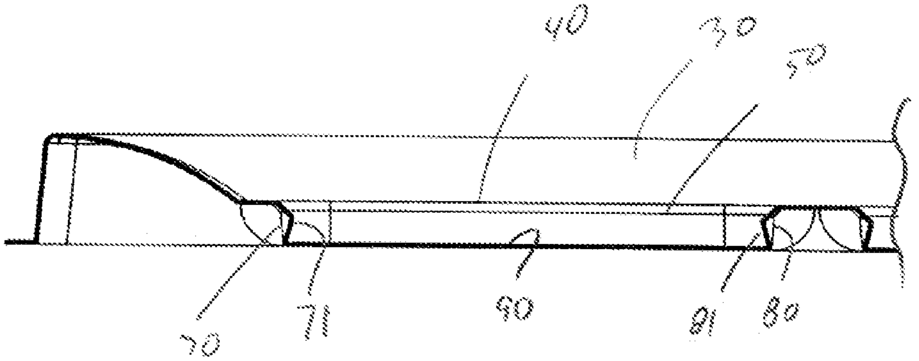
FIG. 5 is a cross-sectional view taken along line 5-5 in FIG. 4.
Figure 6:
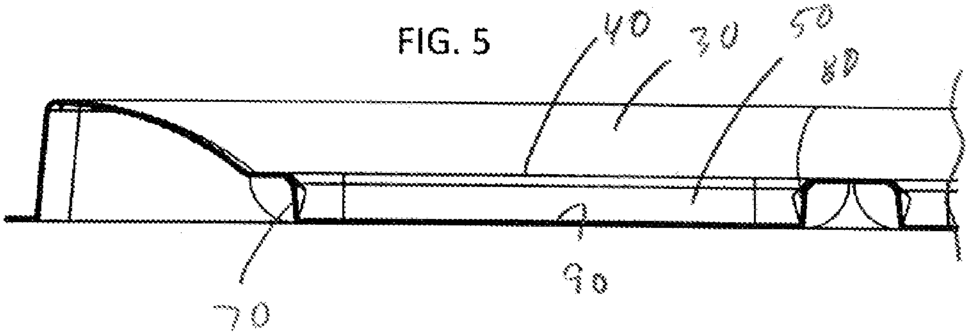
FIG. 6 is a cross-sectional view taken along line 6-6 in FIG. 4.
Figure 7:
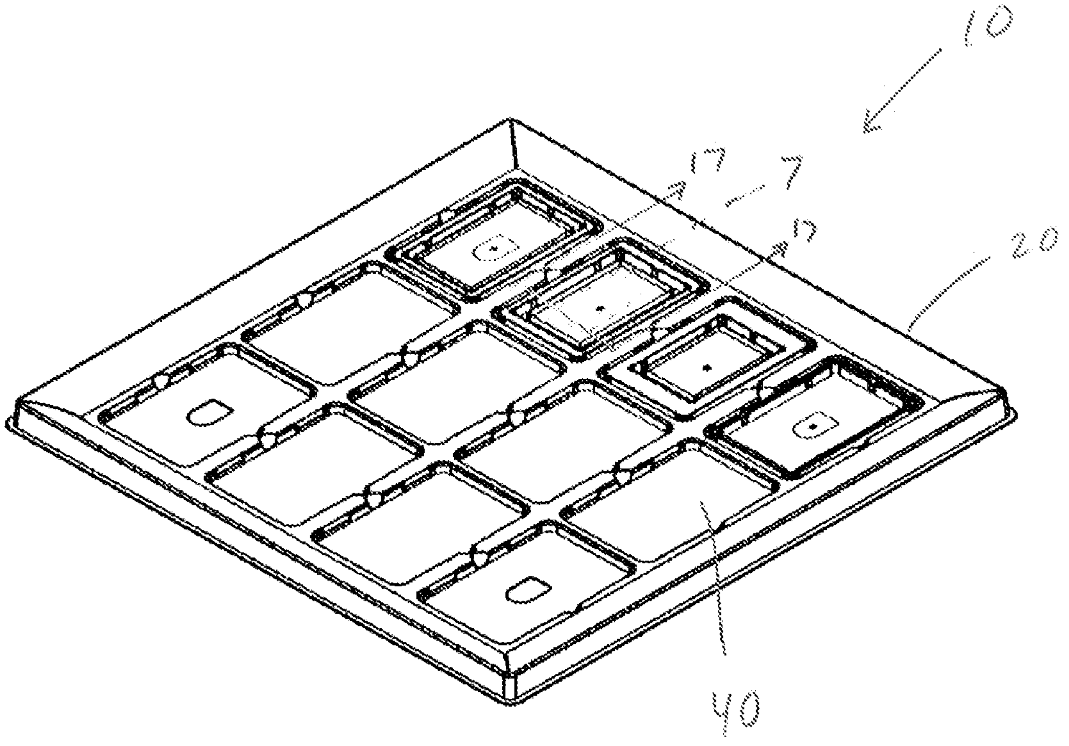
FIG. 7 is a perspective view showing various sized cases received in inserts that are received within the base.
Figure 7A:
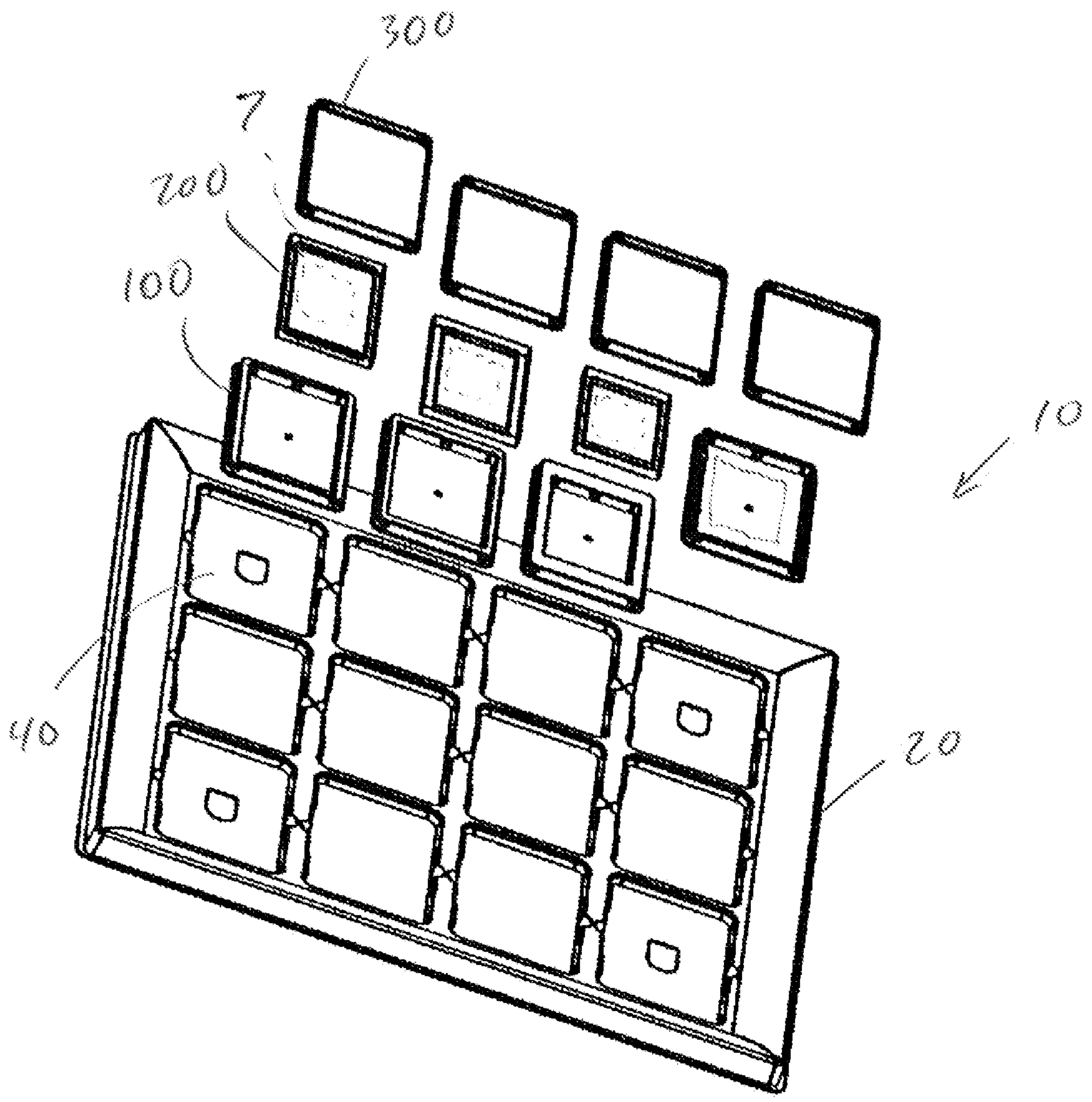
FIG. 7A is similar to FIG. 7, but is an exploded view.
Figure 8:
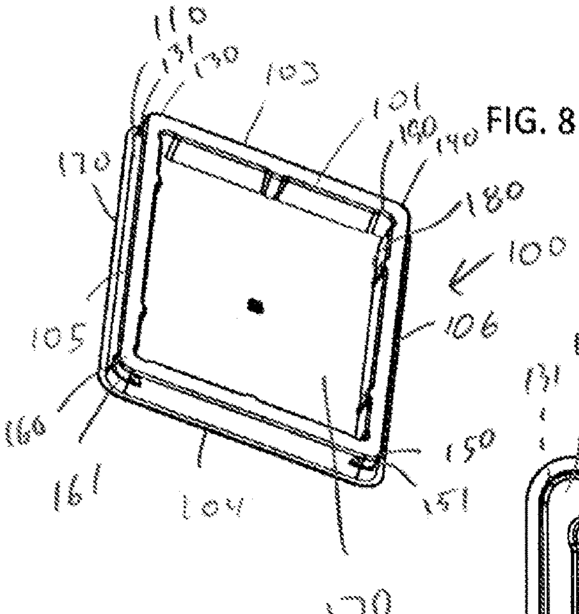
FIG. 8 is a perspective view of an insert.
Figure 9:
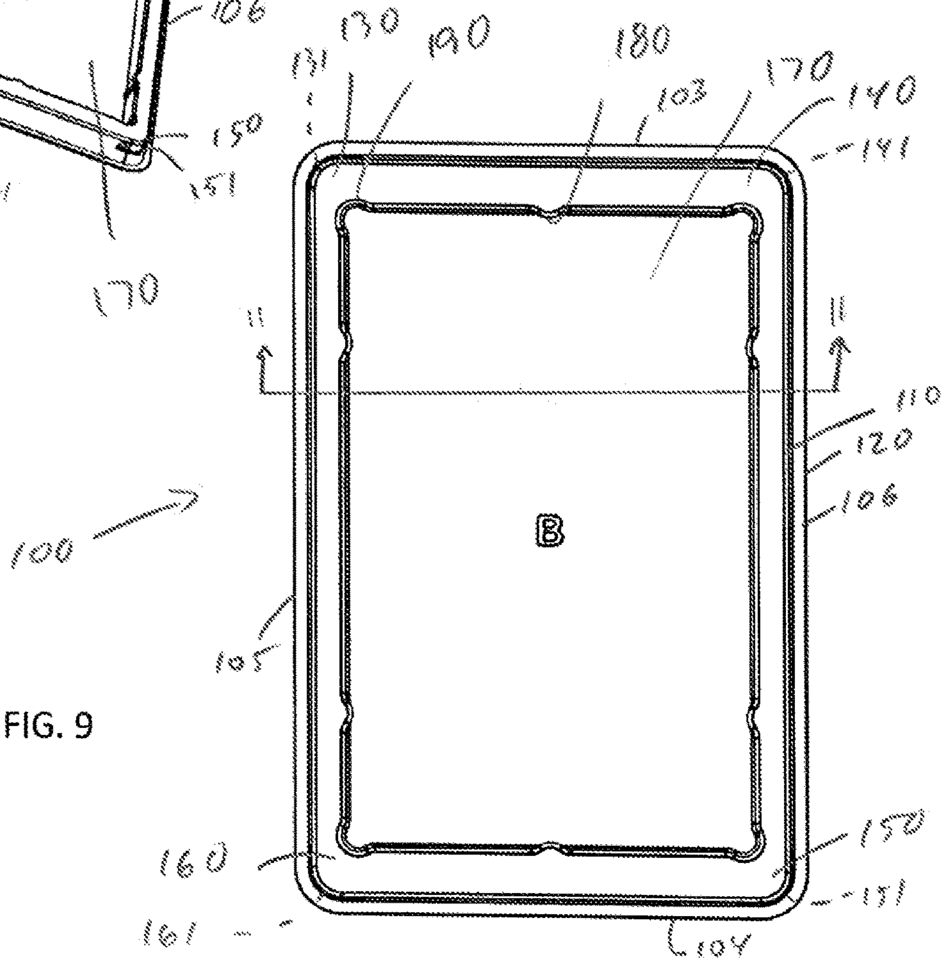
FIG. 9 is a top view of the insert illustrated in FIG. 8.
Figure 10:
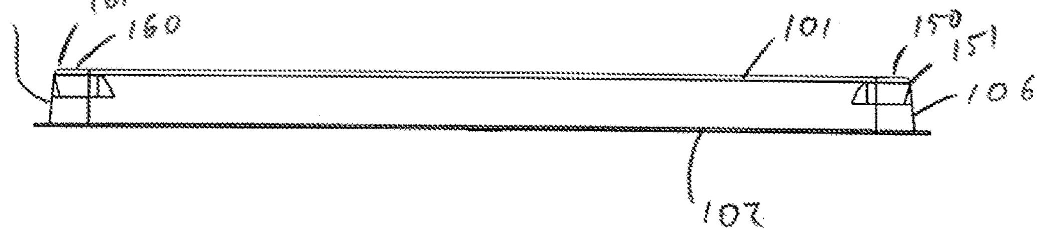
FIG. 10 is a side view of the insert illustrated in FIG. 8.
Figure 11:
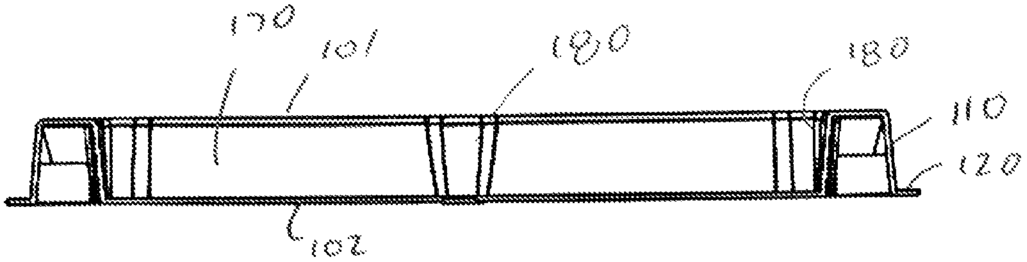
FIG. 11 is a cross-sectional view taken along line 11-11 in FIG. 9.

A preferred embodiment of the present invention is illustrated in FIGS. 1-20. The invention is a display 10 that can be mounted to a wall 5 (such as shown in FIG. 3) or other vertical structure. The display 10 can have a base 20, an insert 100, a case 200 and an optional cover 300 for the insert 100. Each of these components may have individual novelty, and as such, the invention is not limited to preferred embodiments and combinations thereof as presented in this detailed description of preferred embodiments.

The present invention 10 is used to display one or more items 7, such as a card (collecting card such as sports card or gaming card, for example). Preferred dimensions (proportional and actual) described herein and shown in the figures are intended to illustrate use when the item is a card. The dimensions are preferably modified when other items, including but not limited to, pictures, comic books, coins and stamps are used.

It will be appreciated that several differently sized inserts 100 are cases 200 are provided and illustrated herein. All inserts will have number 100 regardless of size, and all cases will have number 200 regardless of size, for sake of clarity.

It is further appreciated that the inserts and covers are preferably made of a clear material, such as a clear plastic so that the back of an item being displayed can be viewed through the insert when the insert is removed from the base.

The base 20, best illustrated in FIGS. 1-7A, has a front 21, a back 22, a top 23, a bottom 24, a side 25 and a second side 26. A perimeter frame 30 is around the perimeter of the base 20. The perimeter frame 30 forms an outside edge of the base, and is located outside of one or more cavities 40. It is appreciated that while 12 cavities are illustrated, that there could be more or fewer without departing from the broad aspects of the present invention. The illustrated base has 12 cavities and has external dimensions of 24 inch by 24 inch. Other cavity configurations and other overall base dimensions could be used without departing from the broad aspects of the present invention. The base is preferably made with at least one cavity. In one example of an alternative configuration, there could be a number of cavities based on the number of players on a team (for sports cards), and that the base could include other graphics and or text in addition to the cavities.

Cavity 40 has a top wall 50, a bottom wall 60, a side wall 70 and a side wall 80. The four walls preferably defines a rectangular cavity in the illustrated embodiment (there can be any number of walls forming any shape including round, oval, square, etc. without departing from the broad aspects of the present invention). Side wall 70 preferably has two protrusions 71 and 72. Side wall 80 preferably has two protrusions 81 and 82. It is preferred that the protrusions 71 and 72 are mirror images of protrusions 81 and 82, taken about a vertical center line of the cavity. There could be more or fewer protrusions without departing from the broad aspects of the present invention. Wall 70 preferably has a finger release 73 and wall 80 preferably has a finger release 83. Each finger release preferably is formed of a cutout (preferably semispherical) from the cavity side wall. The releases are preferably spaced between protrusions. There could be more or fewer than two releases in the cavity 40 without departing from the broad aspects of the present invention. The cavity 40 has a rear wall 90. Cavity 40 can have a rear opening 91 formed therethrough that is useful for mounting structures (adhesive, hook and loop fabric, hooks, etc.) to be used. In an embodiment with more than four cavities, it is preferred that the corner cavities all have mounting holes or openings therethrough.

Turning now to FIGS. 8-11, it is seen that one size of an insert 100 is illustrated. The insert 100 has a front 101, a back 102, a top 103, a bottom 104, a side 105 and a second side 106. Exterior walls 110 preferably have a lip 120 about the perimeter. The lip 120 preferably extends continuously about the perimeter, on the lower end of the perimeter walls (where top, bottom and sides meet the back of the insert). However, it is understood that there could be several distinct lips without departing from the broad aspects of the present invention. The insert 100 is preferably rectangular (but can have a different shape), and has corners 130, 140, 150 and 160. Corner 130 has a snap 131. Corner 140 has a snap 141. Corner 150 has a snap 151. Corner 160 has a snap 161. The walls also define an interior chamber 170. The chamber 170 is preferably rectangular in shape. A plurality of retainers 180 are provided. The retainers 180 preferably have a vertical outer wall, that extends from a rear angled (from bottom to top) chamber sidewall. There are preferably two retainers on each side, and one retainer on each of the top and bottom of the chamber. It is appreciated that more or fewer retainers could be used without departing from the broad aspects of the present invention. There are preferably four reliefs 190, with one in each corner of the chamber. Each relief is formed of a bump out from the chamber to provide clearance of the case corners.

Insert 100 is removably received within a cavity 40. The lip 120 flushly engages the bottom of the cavity and is held below the protrusions 71, 72, 81 and 82 to lock the insert in place. The lip 120 thus provides at least two functions (flush engagement and locking engagement). Removal of the insert can be accomplished by inserting a finger into the finger release 73 or 83, and vertically lifting on the insert to move the locking lip past the protrusions on one side of the cavity.

Figure 12:
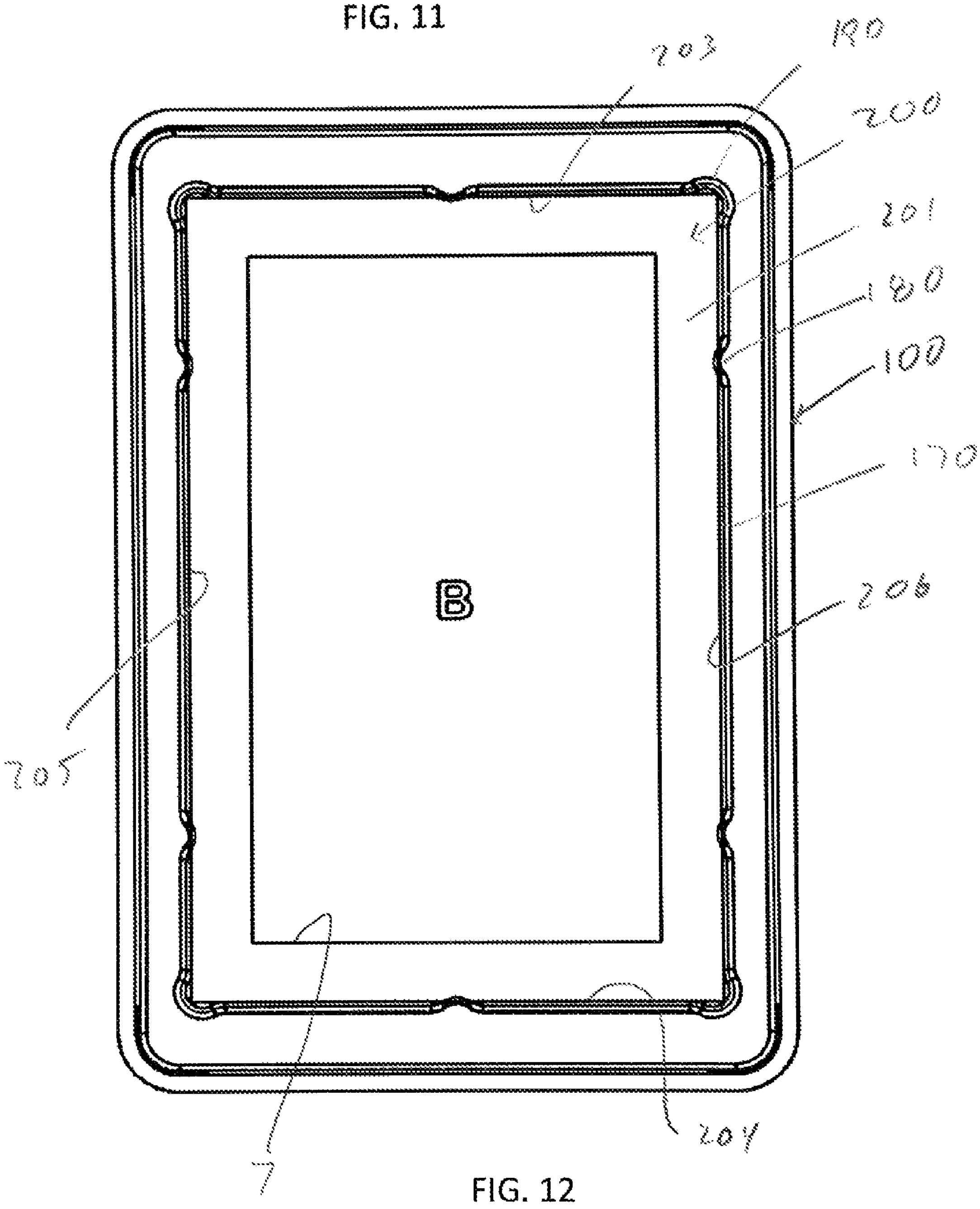
FIG. 12 is a top view showing a case received within the insert show in FIG. 8.

Turning now to FIG. 12, it is seen that an embodiment of a case 200 is illustrated shown being received within the interior chamber 170 of the insert 100. The case can removably fit in a chamber with interior dimensions of 3.25 inches by 5.125 inches by. 375 inches.

Figure 13:
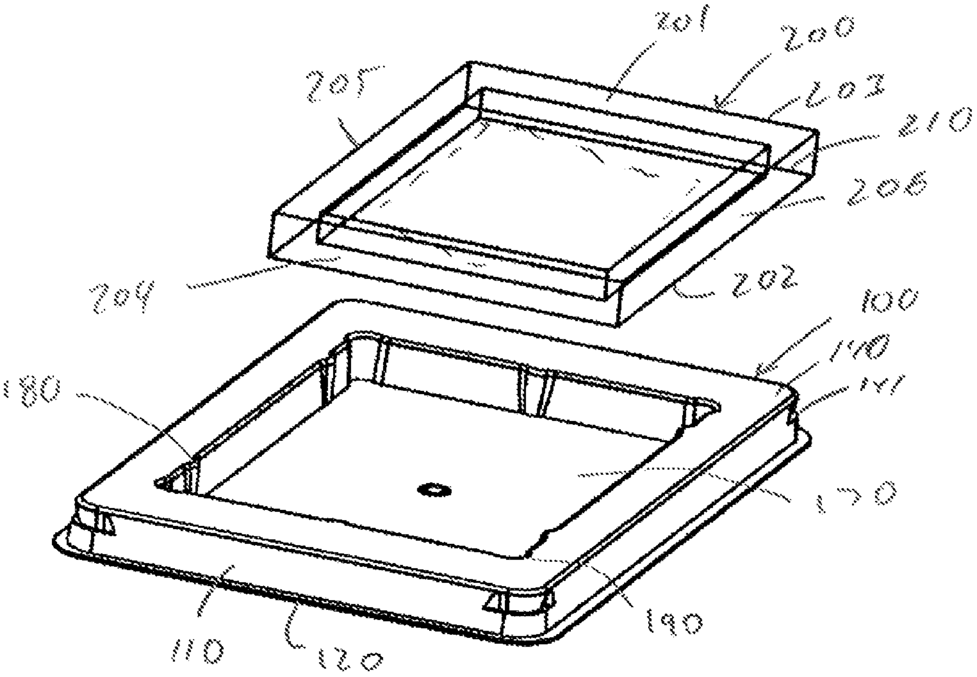
FIG. 13 is an exploded view showing a second sized case with an insert having a second cavity size.

Turning now to FIGS. 13, it is seen that an insert with a different interior chamber size is provided. The chamber has interior dimensions of 2.875 inches by 4.375 inches by. 375 inches.

Figure 14:
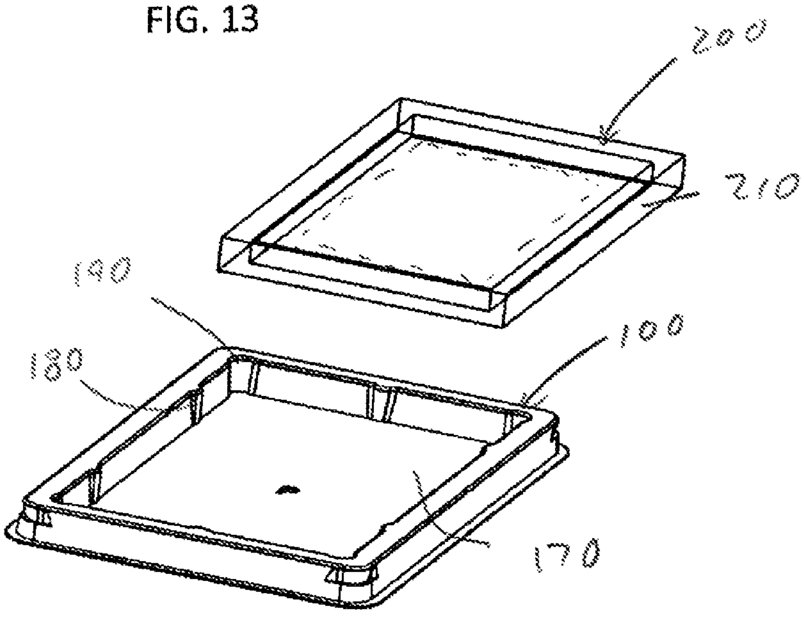
FIG. 14 is an exploded view showing a third sized case with an insert having a third cavity size.

FIGS. 14, it is seen that an insert with a different interior chamber size is provided. The chamber has interior dimensions of 3.17 inches by 5.35 inches by 0.375 inches.

Case 200 has a front 201, a back 202, a top 203, a bottom 204, a side 205 and a side 206. The case 200 has an external perimeter 210 that is engaged by the retainers 180 of the interior chamber 170 of the insert 100, as seen in FIG. 12. The case 200 can be removed from the insert 100 when the insert is flexed, allowing the case to be disengaged from the retainers 180.

These three insert sizes illustrated in the figures are illustrated for exemplary purposes only for use with three different exemplary case sizes. Each insert preferably has the same external dimensions as each other, and each has different interior chamber dimensions to enable the inserts to receive specific cases 200 used by specific companies, such as card grading companies. This allows multiple cases to be simultaneously displayed as they are received within the base via an insert with an interior chamber size that matches the particular case. The insert exterior dimensions are constant regardless of the insert interior chamber dimensions, wherein all the inserts can be removably received within the base.

Figure 15:
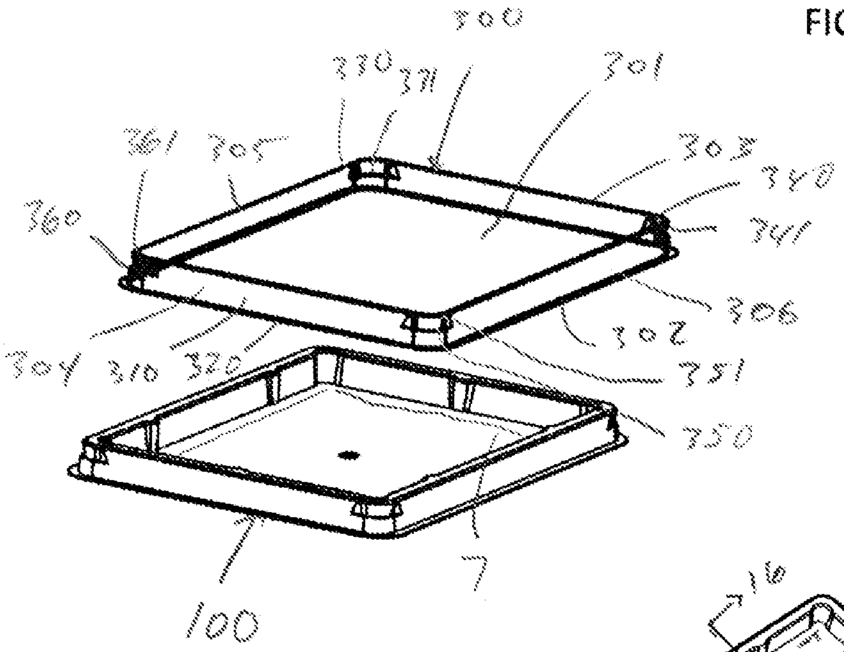
FIG. 15 is an exploded view of a cover and a case, optionally for use without a case.

Turning now to FIG. 15, it is seen that an embodiment of a cover 300 is illustrated. The cover 300 has a front 301, a back 302, a top 303, a bottom 304, a side 305 and a side 306. The top, bottom and sides have exterior walls 310 with a perimeter lip 320 at the bottom of the exterior walls. The lip preferably extends continuously about the exterior walls, but it is appreciated that several separate lips could be used without departing from the broad aspects of the present invention. The cover 300 is preferably rectangular for cards (although it is appreciated that the shape may vary), and has corners 330, 340, 350 and 360. Corner 330 has a snap 331. Corner 340 has a snap 341. Corner 350 has a snap 351. Corner 360 has a snap 361.

Figure 15A:
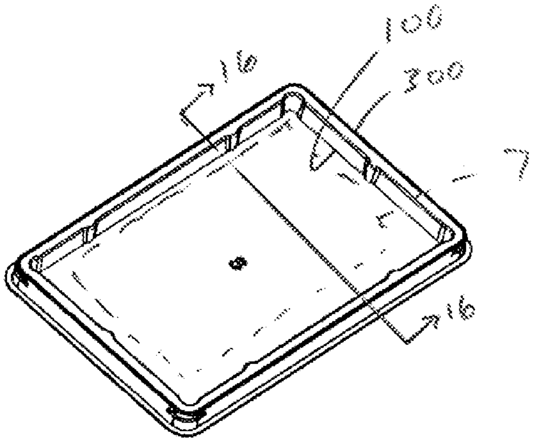
FIG. 15A is a perspective view showing a case and cover in a mating relationship.
Figure 16:
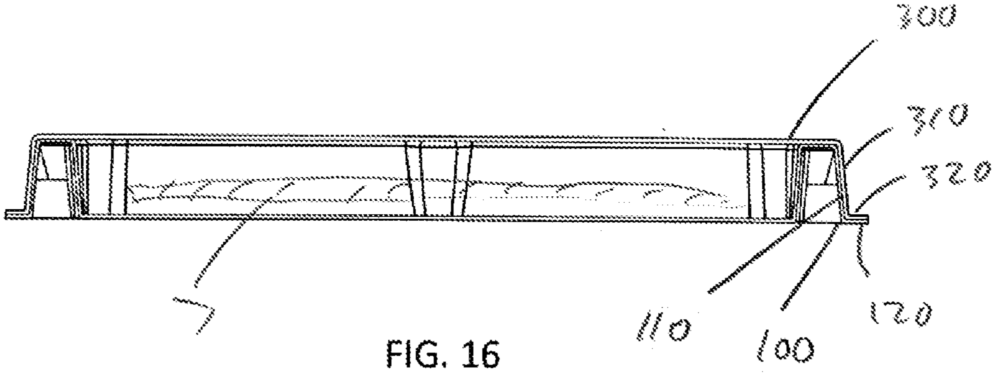
FIG. 16 is a cross-sectional view taken along line 16-16 in FIG. 15A.

The cover 300 and insert 100 can be placed in mating engagement, as seen in FIGS. 15A and 16. In this regard, corner snaps of the cover and insert mate in a snapping engagement. When mated, the lip 320 of the cover stacks atop lip 120 of the insert. The cover 300 can be mated with insert 100 to receive an item 7 even without use of a case within the interior region defined by the cover 300 and insert 100.

Figure 17:
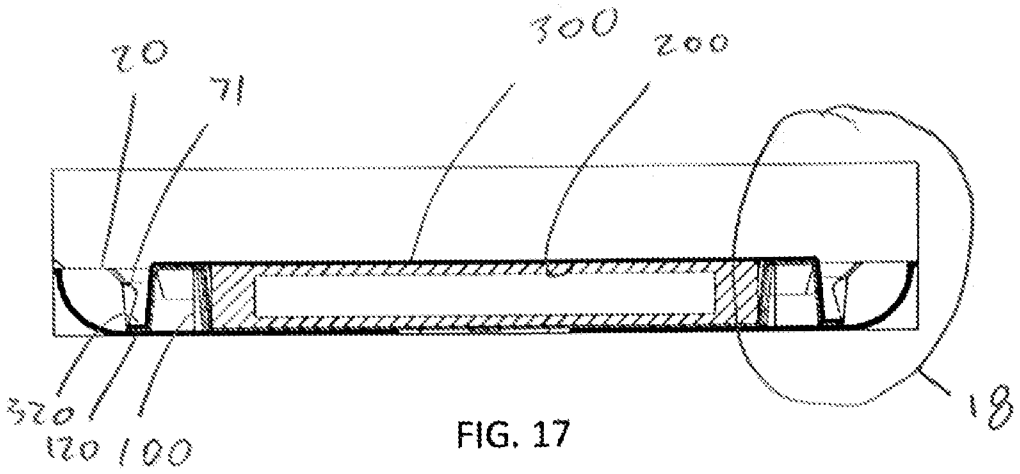
FIG. 17 is a cross-sectional view taken along line 17-17 in FIG. 7.
Figure 18:
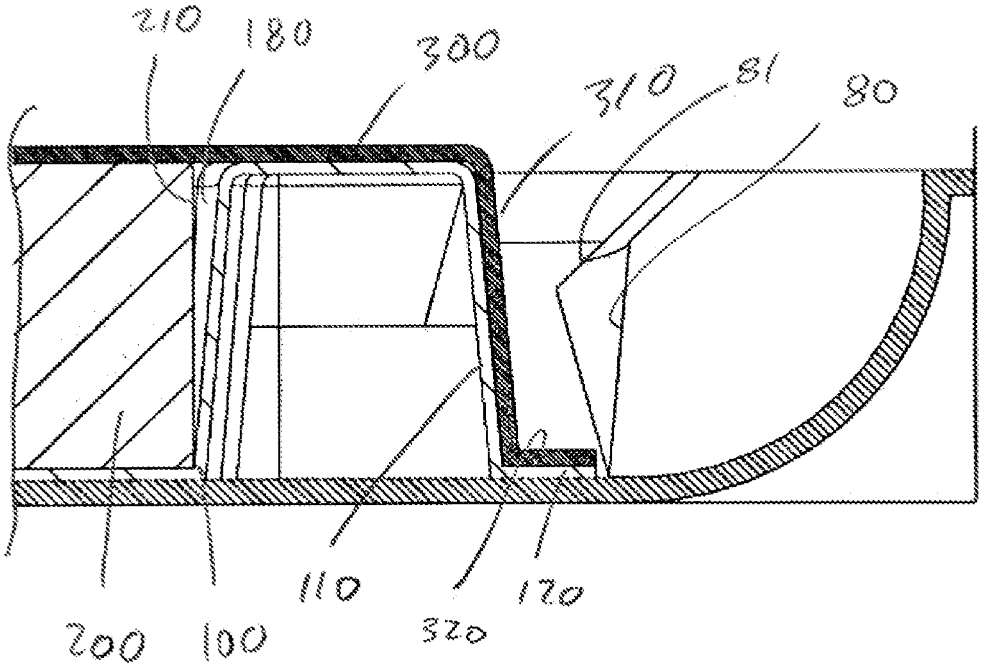
FIG. 18 is a close-up view of a portion of FIG. 17.

FIGS. 17-18 illustrate engagement of base 20, insert 100, case 200 and cover 300.

Figure 19:
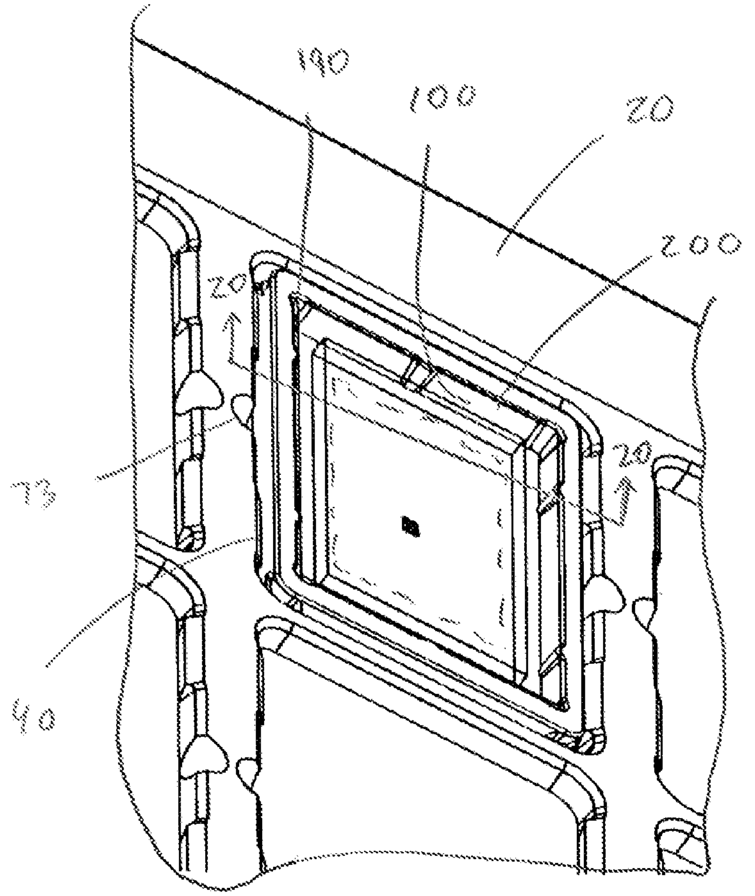
FIG. 19 is a perspective view showing a display without a cover.
Figure 20:
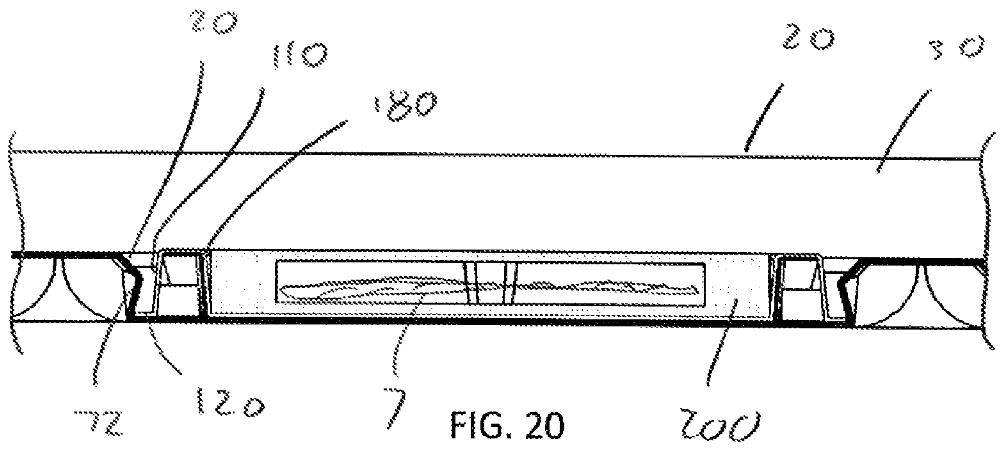
FIG. 20 is a cross-sectional view taken along line 20-20 in FIG. 19.

FIGS. 19-20 illustrate a use of the present invention without a cover 300. In this regard, engagement of base 20, insert 100 and case 200 is shown.

Figure 22:
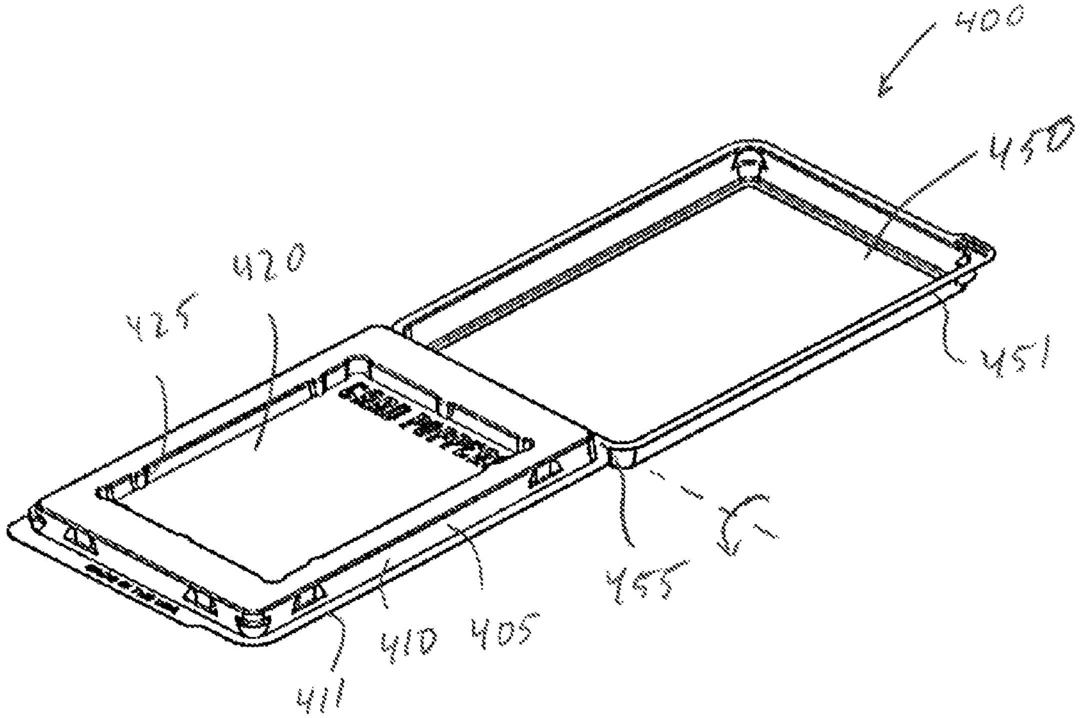
FIG. 22 is a perspective view of an embodiment of an insert with an integrated cover.
Figure 23:
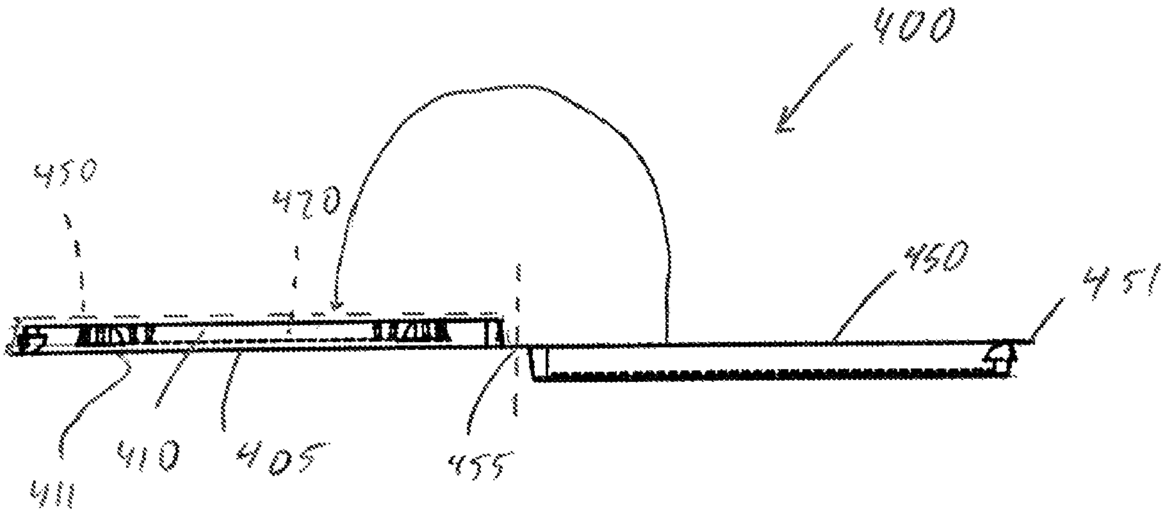
FIG. 23 is a side view of the insert shown in FIG. 22.
Figure 24:
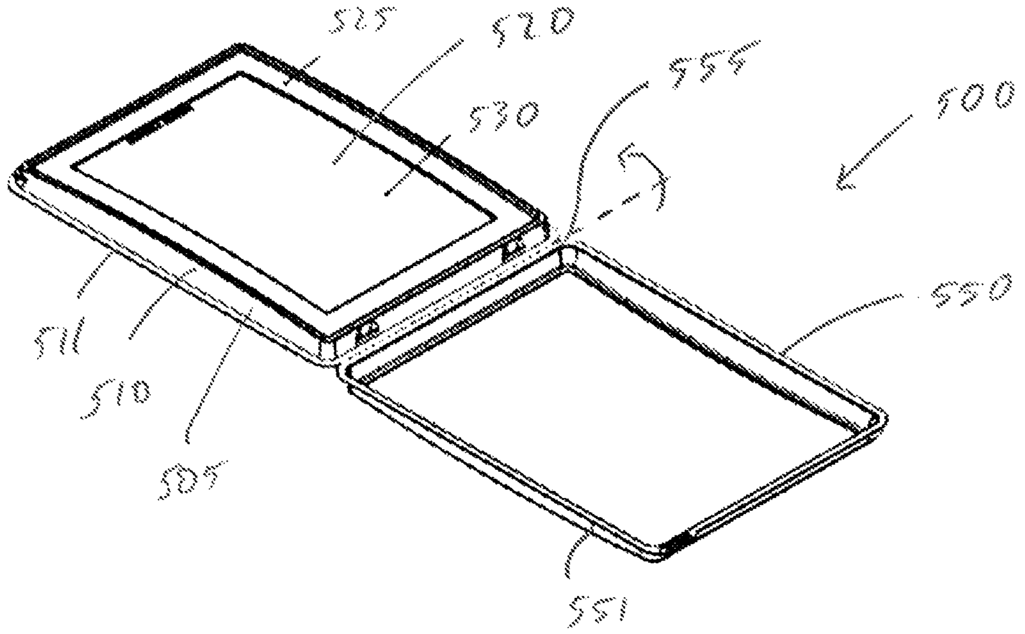
FIG. 24 is a perspective view of an embodiment of an insert with an integrated cover.
Figure 25:
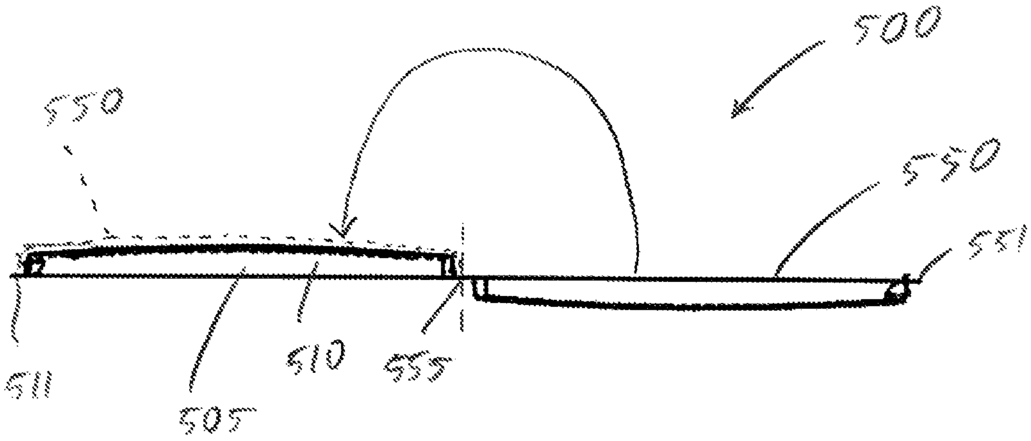
FIG. 25 is a side view of the insert shown in FIG. 24.

Turning now to FIGS. 22-23, it is seen that an alternative embodiment of an insert 400 is provided. The insert 400 has a body 405 with exterior walls 410 having a perimeter lip 411. In a preferred embodiment, the lip extends all the way around the perimeter at the bottom of the body. The insert 400 also has an interior chamber 420 with one or more retainers 425. A cover 450 is hingedly connected to the body 405 with a hinge 455. The cover has a perimeter lip 451 that is positioned adjacent to lip 411 when the cover is in the closed position (dashed lines in FIG. 23). The insert 400 selectively receives a case 200 in a manner as described above. When the cover is in the closed position, the insert 400 is selectively received by a base cavity 40 in a manner similar to insert 100 described above. Both of lips 411 and 451 are retained by base cavity protrusions.

Turning now to FIGS. 24-28, it is seen that an alternative embodiment of an insert 500 is provided. The insert 500 has a body 505 with exterior walls 510 having a perimeter lip 511. In a preferred embodiment, the lip extends all the way around the perimeter at the bottom of the body. The insert 500 also has an interior chamber 520 with a first recess 525 with a first recess perimeter and a second recess 530 with a second recess perimeter.

Figure 26:
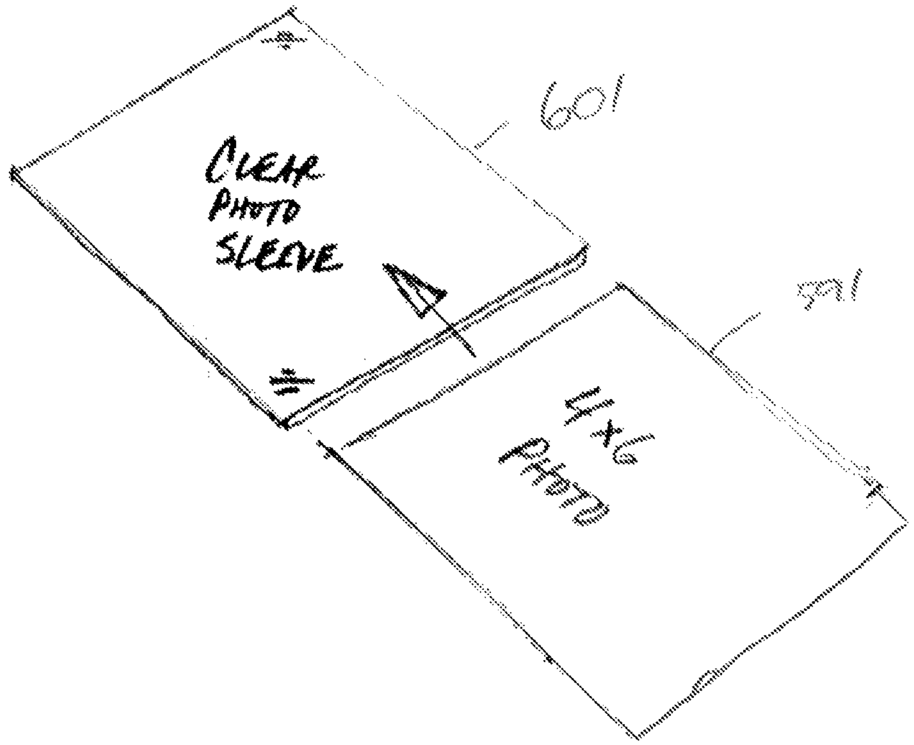
FIG. 26 is a perspective view showing a photo with optional case.
Figure 27:
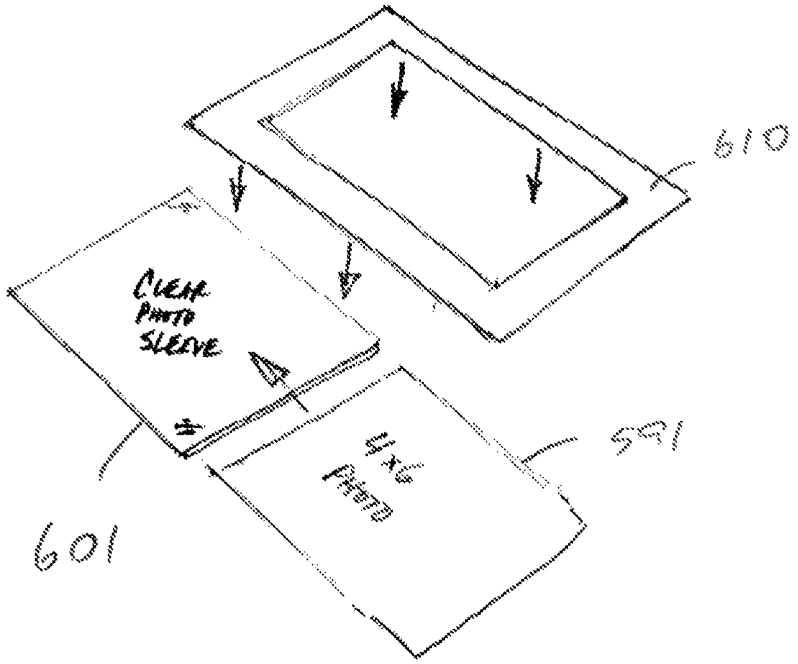
FIG. 27 is a perspective view showing a photo with optional case, and a mat.
Figure 28:
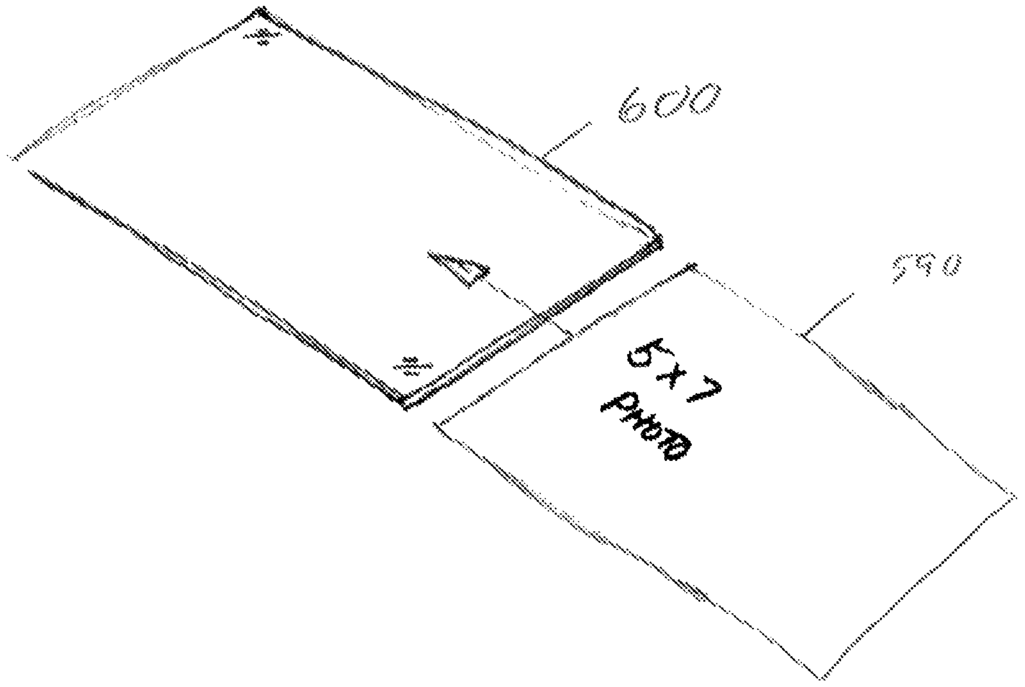
FIG. 28 is a perspective view showing a photo with an optional case.

The first recess 525 is preferably sized to receive a **5*x*7 photo 590 either directly or in a case 600 (soft or hard case) (FIG. 28). The second recess 530 is preferably deeper than the first recess 525, and the second recess perimeter is preferably entirely within the first recess perimeter. The second recess 530 can receive a 4*x*6 photo 591 either directly or within a case 601 (soft or hard case) (FIG. 26). Further a photo or item smaller than 4×6 can be held in either recess with an appropriately sized mat (not shown). Still further, a photo 591 smaller than 5×7 can be held in the 5*x*7 recess 525 when matted with appropriate mat 610 (FIG. 27**).

A cover 550 is hingedly connected to the body 505 with a hinge 555. The cover has a perimeter lip 551 that is positioned adjacent to lip 511 when the cover is in the closed position (dashed lines in FIG. 25). When the cover is closed, the insert 500 is selectively received by a base cavity 40 in a manner similar to insert 100 described above. Both of lips 511 and 551 are retained by base cavity protrusions.

It is appreciated that body 505 could be used with a separate cover without departing from the broad aspects of the present invention.

It is appreciated that while generally rectangular cavities, inserts and covers are described and illustrated, that the present invention is not limited to rectangular shapes.

For example, in the case of coins, it may be preferred to have square or round cavities, inserts and/or covers. The locking features such as lips and protrusions can be configured as such for use with any shape.

It is appreciated that there are several unique structural features according to various aspects of the present invention. These features can be utilized individually or combined with other features in any possible way, such as being coupled with other features, tripled with other features and/or used all together without departing from the broad aspects of the present invention. For example, each of the following features could be used individually or in any manner of combination:

A display comprising: a base; an insert, said insert being removably secured to said base; and a case, said case being removably secured to said insert.

An insert for securing a case and being secured in a base, said insert comprising: a front; a back; a top; a bottom; a first side; a second side; exterior walls having a perimeter lip and at least one corner snap; and an interior chamber having at least one retainer.

A display comprising for an item: a base, said base having a cavity with a protrusion; and an insert, said insert having: a body with: exterior walls with a body lip; and an interior chamber, said interior chamber having a first recess with a first recess perimeter and a second recess with a second recess perimeter; and a cover, said cover being hingedly connected to said body, wherein: said insert is removably received within said base and is held in said base when said body lip is retained by said protrusion, and the item is received within the first recess when the item is sized corresponding to the first recess perimeter or within the second recess when the item is sized corresponding to the second recess perimeter.

Each of these structures can also be combined with each other and/or with one or more of the following features, if not already recited above: an insert lip that is continuously formed about the perimeter of the insert, a dual-purpose locking and flush engaging insert lip, and mating cover and insert engagement.

It is also appreciated that the insert can be used to directly display an item (i.e. without using a base) by mounting the insert directly to a wall or other surface. The perimeter lip will form a flush engagement with the mounting surface.

It is further appreciated that there are several unique method features according to the present invention. These features can be utilized individually or combined with other features in any possible way, such as being coupled with other features, tripled with other features and/or used all together without departing from the broad aspects of the present invention.

Figure 21:
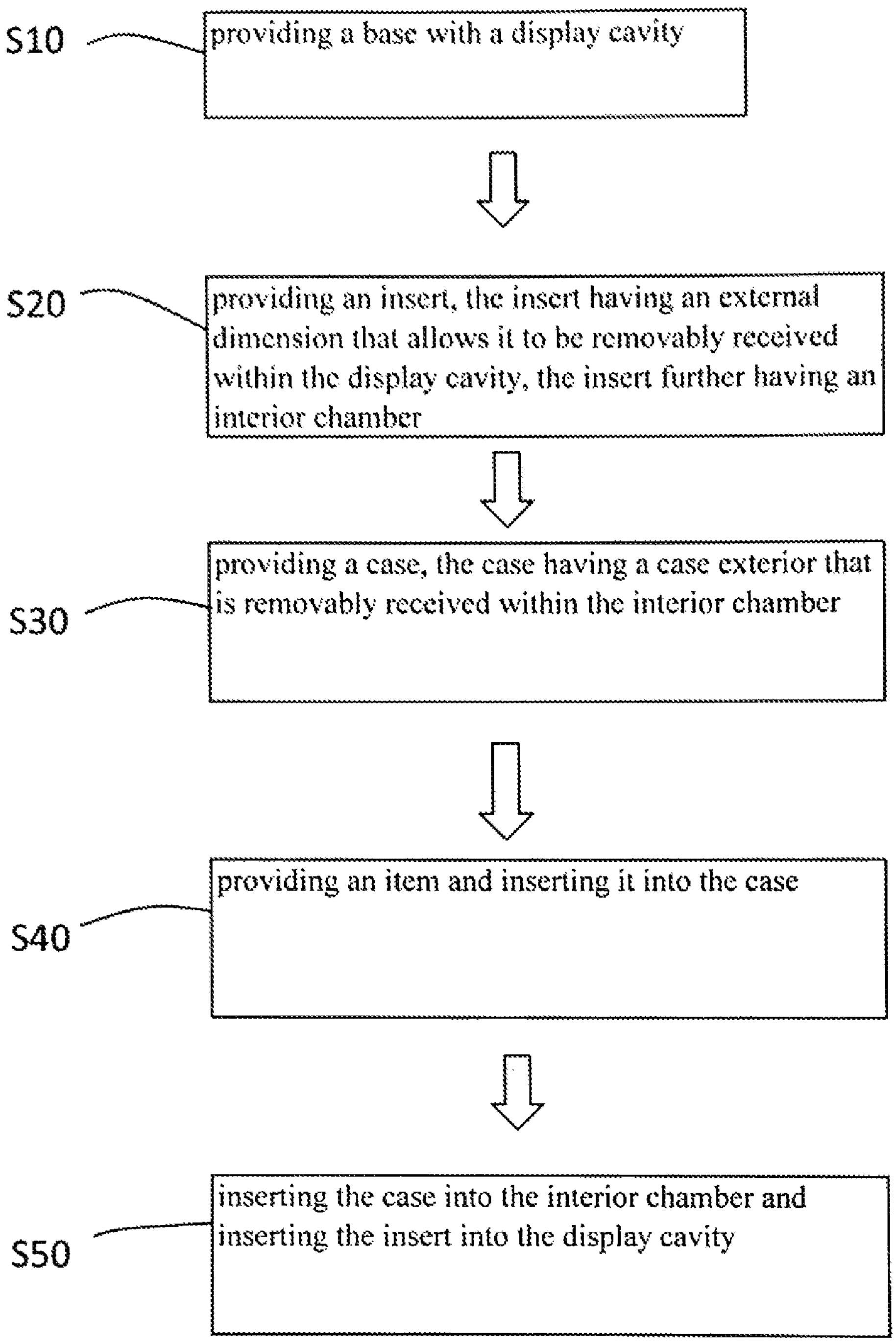
FIG. 21 is a flow chart showing a method of displaying an item.

One preferred method of displaying an item has the steps as illustrated in FIG. 21. Step S10 is providing a base with a display cavity. Step S20 is providing an insert, the insert having an external dimension that allows it to be removably received within the display cavity, the insert further having an interior chamber. Step S30 is providing a case, the case having a case exterior that is removably received within the interior chamber. Step S40 is providing an item and inserting it into the case. Step S50 is inserting the case into the interior chamber and inserting the insert into the display cavity.

A method of displaying an item can comprise the steps: providing a base with a display cavity; providing an insert, the insert having an external dimension that allows it to be removably received within the display cavity, the insert further having an interior chamber; providing a case, the case having a case exterior that is removably received within the interior chamber; providing the item and inserting the item into the case; and inserting the case into the interior chamber and inserting the insert into the display cavity.

This method can be modified and/or combined with one or more of the following methods or steps. The step of providing an insert can include providing a continuous lip about the insert perimeter. The step of providing a base can include providing a base with a plurality or protrusions. The step of providing a display can include providing a cover. Further, the cover can mate with the insert. The step of providing an item can be providing a card. This method can further be modified by providing multiple cavities and inserts.

Thus, it is apparent that there has been provided, in accordance with the invention, a display with a base and an insert that fully satisfies the objects, aims and advantages as set forth above. While the invention has been described in conjunction with specific embodiments thereof, it is evident that many alternatives, modifications, and variations 5 will be apparent to those skilled in the art in light of the foregoing description. Accordingly, it is intended to embrace all such alternatives, modifications, and variations as fall within the spirit and broad scope of the appended claims.

We claim:

1. A display comprising:

a base comprising a cavity having wall, the wall having a protrusion extending into the cavity;

an insert, said insert comprising an insert exterior wall with a lip and an interior chamber with a retainer, the insert being removably secured to said base within the cavity by positioning the lip under the protrusion so that the insert is retained by the base; and a case, said case being removably secured to said insert by the retainer, wherein:

said cavity is a first cavity and the base further comprises a second cavity, said first cavity being sized the same as the second cavity;

said insert is a first insert having a first insert exterior dimensions and a first insert interior chamber with first interior chamber dimensions;

said display further comprises a second insert having a second insert exterior dimensions and a second insert interior chamber with second insert interior chamber dimensions;

said case is a first case having first case exterior dimensions, said first case being selectively received within said first insert;

said display further comprises a second case having a second case exterior dimensions, said second case being selectively received with said second insert; and said first insert exterior dimensions are the same as said second insert exterior dimensions, and said first insert interior chamber dimensions are different than said second insert interior chamber dimensions.

2. The display of claim 1 further comprising a cover, said cover mating with said insert, and said insert and said cover being removably secured to said base.

3. The display of claim 1 wherein said insert has a hinged cover.

4. The display of claim 1 wherein said cavity further comprises a finger relief formed into the wall.

5. The display of claim 1 wherein said first case external dimensions are different than said second case external dimensions.

6. The display of claim 1 wherein said insert has a first corner with a first corner snap.

7. An insert for securing a case and being secured in a base, said insert comprising:

a front;

a back;

a top;

a bottom;

a first side;

a second side;

exterior walls having an exterior with a perimeter lip extending all the way around the exterior and at least one corner snap on the exterior of the exterior walls; and an interior chamber interior of the exterior walls, the interior chamber having at least one retainer extending inward from the exterior walls.

8. The insert of claim 7 wherein said perimeter lip extends continuously around said insert.

9. The insert of claim 8 further comprising a hinged cover.

10. A method of displaying an item, the method comprising the steps:

providing a base with a display cavity, wherein the display cavity has a wall and the wall has a protrusion extending into the display cavity;

providing an insert, the insert having an insert exterior wall with a lip and an external dimension that allows it to be removably received within the display cavity, the insert further having an interior chamber with a retainer;

providing a case, the case having a case exterior that is removably receivable within the interior chamber;

providing the item and inserting the item into the case; and inserting the case into the interior chamber wherein the case is engaged by the retainer, and inserting the insert into the display cavity wherein the lip is positioned under the protrusion.

11. The method of claim 10 wherein:

the step of providing a base with a display cavity comprises the steps of providing a first cavity and a second cavity, the first cavity and the second cavity having the same cavity dimensions;

the step of providing an insert comprises the steps of:

providing a first insert having first insert external dimensions that allow it to be removably received within the first cavity, the first insert further having a first insert interior chamber; and providing a second insert having second insert external dimensions that allow it to be removably received within the second cavity, the second insert further having a second insert interior chamber, wherein the first insert external dimensions are the same at the second insert external dimensions;

the step of providing a case comprises the step of providing a first case and a second case;

the step of providing an item and inserting the item into the case comprises the steps of providing a first item and inserting the first item into the first case, and providing a second item and inserting the second item into the second case;

the step of inserting the case into the interior chamber and inserting the insert into the display cavity comprises the steps:

inserting the first case into the first insert chamber and inserting the first insert into the first cavity; and inserting the second case into the second insert chamber and inserting the second insert into the second cavity.

12. The method of claim 11 wherein the first case and the second case have different external dimensions.

13. A display comprising for an item:

a base, said base having a cavity with a wall, the wall having a protrusion extending into the cavity from the wall; and an insert, said insert having:

a body with:

exterior walls with a body lip, the body lip being on and extending around an exterior of the body; and an interior chamber, said interior chamber having a first recess with a first recess perimeter and a second recess with a second recess perimeter; and a cover, said cover being hingedly connected to said body, wherein:

said insert is removably received within said base and is held in said base when said body lip is retained by said protrusion, and the item is received within the first recess when the item is sized corresponding to the first recess perimeter or within the second recess when the item is sized corresponding to the second recess perimeter.

14. The display of claim 13 wherein said cover is a rounded cover.

15. The display of claim 13 wherein:

said cavity is a first cavity and said base has a second cavity;

said insert is a first insert and is selectively received within said first cavity; and said display comprises a second insert that is selectively received within said second cavity.

16. The display of claim 13 wherein said cover has a cover lip, said cover lip being adjacent to said body lip when said insert is in a closed position and said cover lip is held by said protrusion when said body lip is held by said protrusion.

* * * * *